Figure 1:
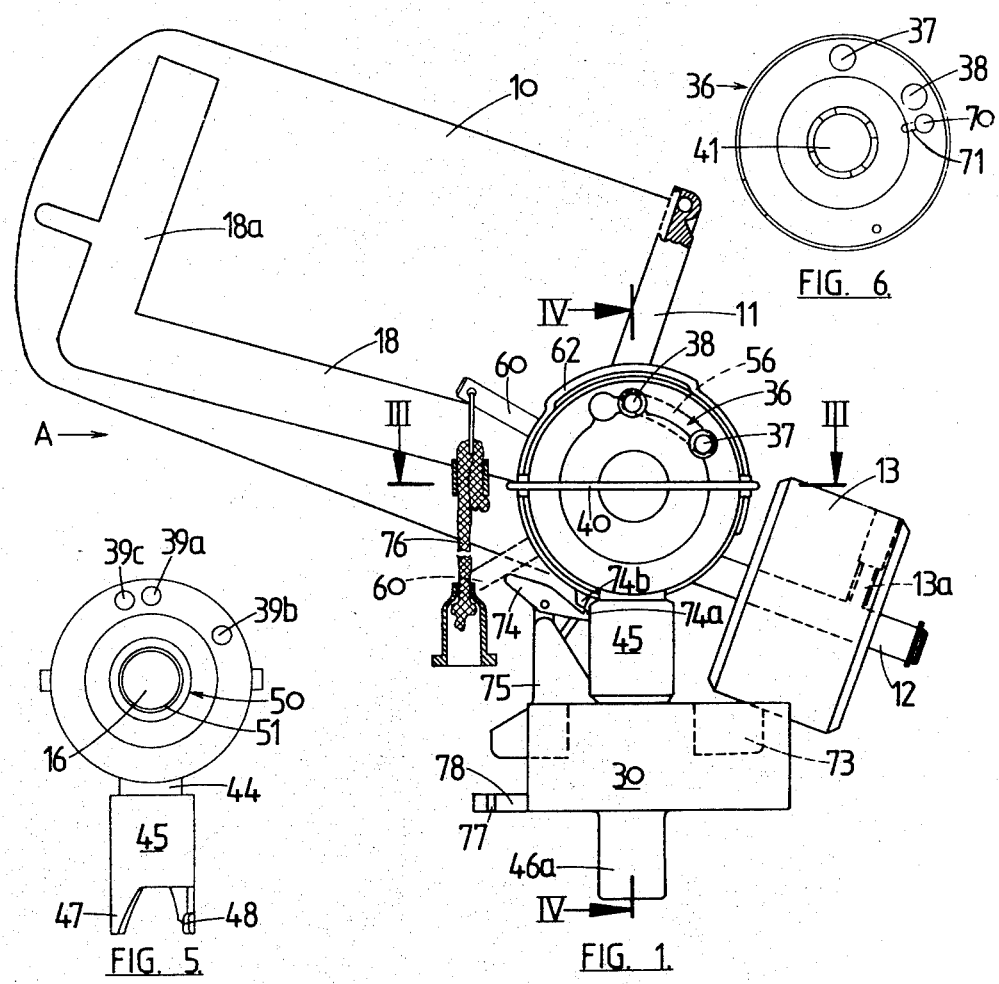

United States Patent [19]

Slater et al.

[11] 4,253,421
[45] Mar. 3, 1981

[54] LIQUID FLOW SENSING DEVICES

[75] Inventors: Paul Slater, Palmerston North; Michael J. Scott, Feilding, both of New Zealand

[73] Assignee: Delta Plastics Limited, Palmerston North, New Zealand

[21] Appl. No.: 54,699

[22] Filed: Jul. 5, 1979

[30] Foreign Application Priority Data

Jul. 5, 1978 [NZ] New Zealand .................. 187779

[51] Int. Cl.³ .............................................. A01J 7/00
[52] U.S. Cl. ................................................ 119/14.08
[58] Field of Search .... 119/14.08, 14.01, 14.13–14.17, 119/14.55; 137/408

[56] References Cited

U.S. PATENT DOCUMENTS

| 3,556,053 | 1/1971 | Padman et al. | 119/14.08 |
| 3,957,018 | 5/1976 | Barrett | 119/14.08 |
| 3,986,482 | 10/1976 | Novak | 119/14.08 |
| 4,177,760 | 12/1979 | Slater | 119/14.08 |

Primary Examiner—Hugh R. Chamblee

[57] ABSTRACT

There is disclosed a valve unit for a liquid flow sensing device of the type having a control means which is movable between first and second positions when the flow rate is respectively low and high but biased to the first position. The valve unit comprises three valve sections one of which is movable in response to movement of the control means a second of which is fixed relative to the control means and a third which is movable independently of the other two sections. The valve includes first and second ports, port connecting means, a flow passage and a diaphragm which forms part of the chamber and can close said flow passage. The third valve section can be moved so that the first port is isolated from the second port but coupled to the chamber when the control means is in the first position and moves to the second position. Means are provided for coupling the third valve section to the first valve section such that when the control means reverts to the first position it moves both the first and third sections relative to the second section such that the first port becomes coupled to the second port by the port connecting means and the first port is isolated from the chamber. There is also disclosed a liquid flow sensing device incorporating the valve unit.

12 Claims, 7 Drawing Figures

LIQUID FLOW SENSING DEVICES

This invention relates to a liquid flow sensing device and more particularly concerns the valve unit of a sensing device, the device being for use in milking machinery apparatus which automatically attends to removal of teat cup clusters from animals which have been milked or where the milk flow rate has reached a predetermined level.

Automatic teat cup cluster removal systems have been devised whereby the cluster is automatically removed when the end-point of milking has been reached. With increasing herd sizes being handled by herringbone and rotary platform type milking parlours the need for such systems has become very important in order that the herds can be handled by the minimum number of operators.

The cluster removal system normally incorporates some form of milk flow rate sensing device and an example is disclosed in our New Zealand Pat. No. 183315. Basically, the unit disclosed in the said specification comprises a pivotally mounted container which is biassed toward a first position. At the commencement of the milking operation milk flows into the container until the volume exceeds in weight the counterbalancing or bias weight. The container thus moves to a second position and remains there until the milk flow drops and the milk draining from the container exceeds the inflow so that once more the counterbalance weight is greater with the result that the container moves back to the first position. The unit is so constructed that on returning to the first position the milk line is closed so that vacuum to the cluster is cut off.

The liquid flow sensing device of Pat. No. 183315 includes a valve unit by which vacuum from a vacuum source can be applied to the teat cup cluster or a cluster removal cylinder. The valve unit comprises two valve sections with a third valve section disposed therebetween. One of the two valve sections is mounted to move in response to movement of a control means whilst the other section is fixed in relation thereto. The third or intermediate valve section can be moved relative to both of the other two sections.

This valve unit has worked well in practice, however, as the three sections abut in the face to face arrangement they must be manufactured to close tolerances to prevent ingress of air into the unit. The three sections are maintained in their face to face abutment by vacuum.

It is preferred that the valve unit be constructed of a plastics material and it has been found that due to moulding techniques and the plastics material used that the intermediate valve section cannot be moulded to come within the required tolerances. Accordingly, the present invention relates to a valve unit of a liquid flow sensing device which can be manufactured in plastics material without aforementioned problem arising.

Broadly the invention consists of a valve unit for a liquid flow sensing device of the type having a control means which is movable between first and second positions when the flow rate is respectively low and high but biassed to the said first position, said valve unit comprising a first valve section movable in response to movement of the control means, a second valve section fixed in relation to said first section, first and second ports, a third valve section being movable independently of said first and second valve sections and having means for connecting said first and second ports, a fluid flow passage through said first and second valve sections, a diaphragm for closing said flow passage, the diaphragm forming part of a chamber, said third valve section being movable so that the first port is isolated from said second port but it coupled to said chamber when the control means is in said first position and moves to said second position and means for coupling said third valve section to said first valve section such that as the control means reverts to said first position it moves both the first and third sections relative to said second section and the first port is coupled to said second port by said port connecting means but isolated from said chamber.

According to a second broad aspect the invention provides a liquid flow sensing device comprising control means which is movable between first and second positions when the flow rate is respectively low and high, biassing means to bias said control means to said first position and a valve unit as set forth in the above aspect the first section of said valve unit is coupled to said control means to be movable therewith and said second section is fixed in relation to said first section.

In a third aspect the invention broadly provides an apparatus for the removal of milking machine teat cups from an animal being milked comprising a liquid flow sensing device as set forth in the second aspect, a milk line coupling said valve inlet to a teat-cup cluster, a conduit coupling the container outlet to a milk receiver and vacuum source, a conduit coupling said first port to said vacuum source, a conduit coupling the second port to a cluster removal cylinder and said chamber venting to atmosphere when said first port is isolated from said chamber.

Figure 2:
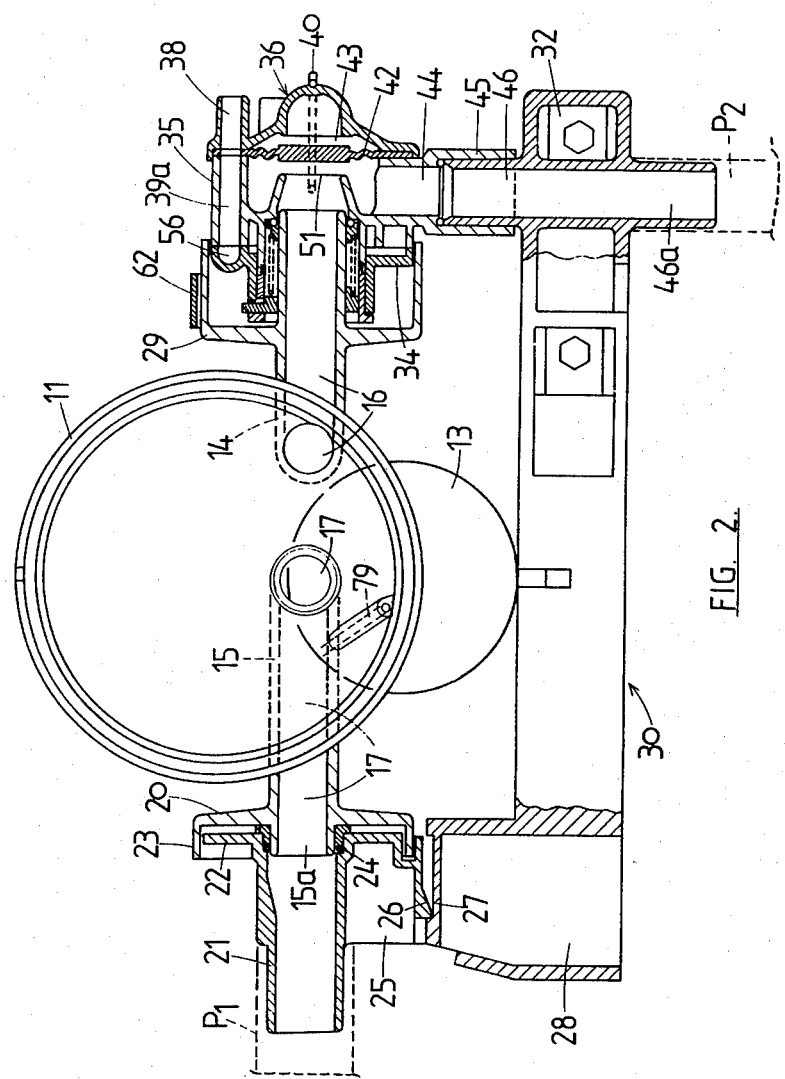
Figure 3:
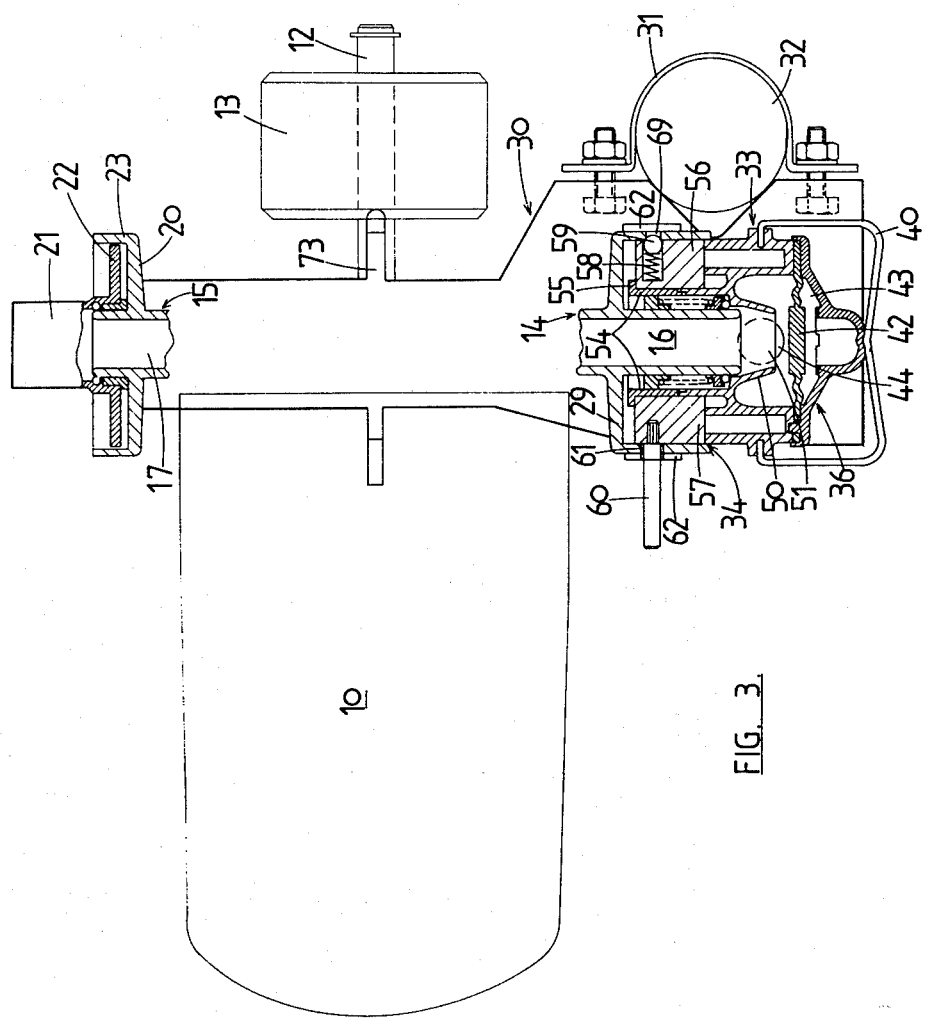
Figure 4:
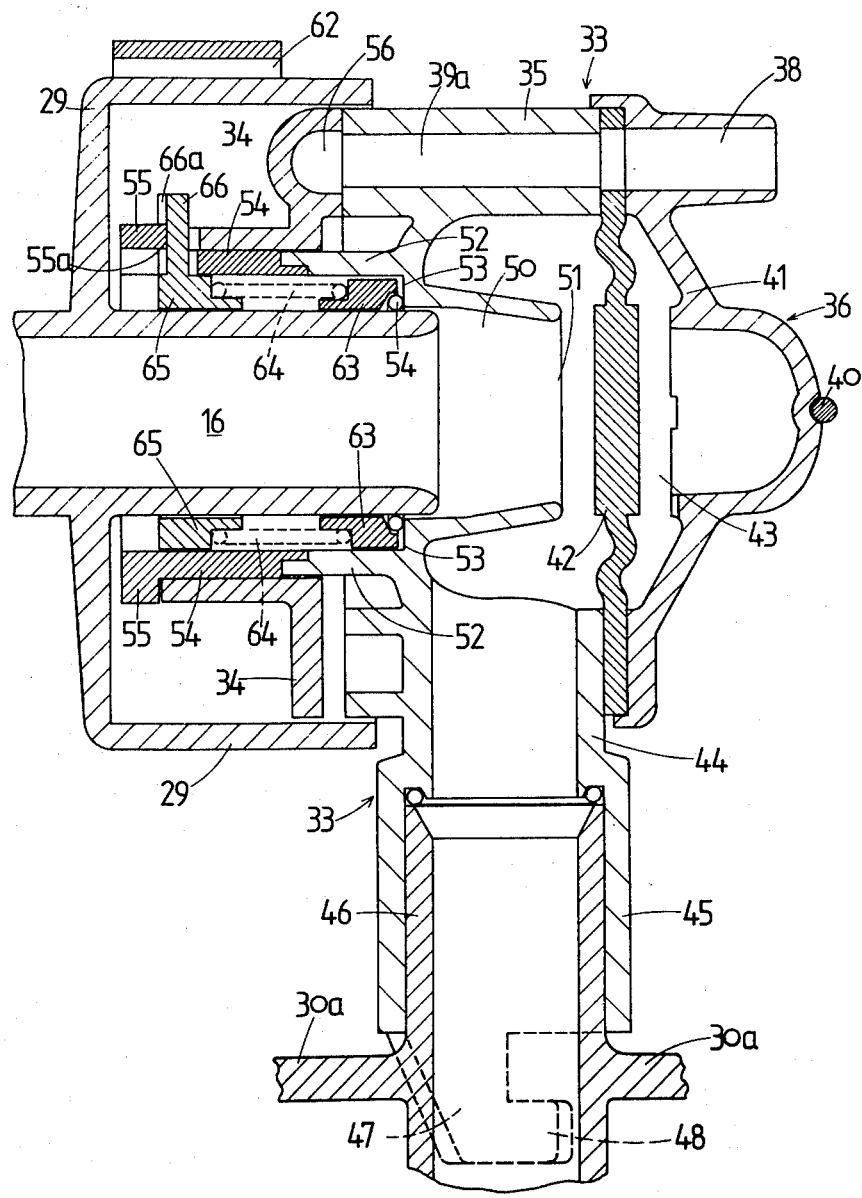
Figure 7:
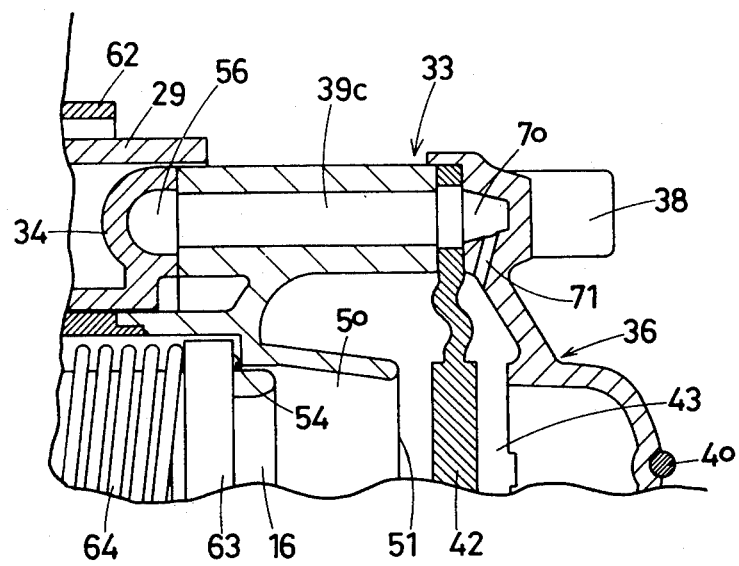

In more fully describing the invention reference will be made to the accompanying drawings in which:

FIG. 1 is a side elevation view of a flow sensing device according to one form of the invention, FIG. 2 is a partially sectioned view of the device as viewed in the direction of arrow A, FIG. 3 is a sectioned plan view taken on line III—III, but with the container and weight shown in ghosted outline, FIG. 4 is a sectional view of the valve unit taken on line IV—IV of FIG. 1, FIG. 5 is an end elevation of valve section 33 with the cover plate and diaphragm removed, and FIG. 6 is an inside view of the cover plate 36, and FIG. 7 is a partial sectional view along the centerline of bore 39c.

Referring firstly to FIG. 1, the weight sensitive control means is a container 10 of glass, stainless steel or plastics material (preferably translucent) mounted on a manifold plate 11. The manifold plate is provided with a projecting support 12 on which is located a weight 13. The position of the weight 13 on support 12 can be adjusted with the weight being locked in position by grub screw 13a. Incorporated in manifold plate 11 are manifolds 14 and 15 which respectively form inlet and outlet passages 16 and 17. Manifold plate 11, manifolds 14 and 15, valve section housing 29 and base 20 of the outlet union are preferably formed as an integral unit of plastics material. The preferred plastics material is polysulfone which is the material also used for all other components of the sensing device. Outlet passage 17 is coupled to a pipe 18 which locates in container 10 and has an elbow portion 18a in which a series of openings (not shown) are provided.

The outlet union couples manifold 15 to an outlet pipe 21 so that the outlet passage 17 opens into pipe 21 which is in turn coupled to a milk line P$_1$ connected to a milk receiver and vacuum source (not shown). This line is open to the container at all times and thus there is no need for a valve.

In the illustrated form the outlet union is made up of a circular base 20 which has a peripheral wall 23 extending therefrom. Pipe 21 is attached to a disc 22 which fits snugly within the peripheral wall 23. Pipe 21 is axially aligned with outlet passage 17.

Formed integrally with pipe 21 is a support fixture 25 which extends downwardly and from pipe 21 and has a pair of outwardly directed feet (not shown) which are adapted to slide between inwardly projecting flanges of a base portion 28 which is formed integrally with mounting bracket 30. Located between the pair of feet is a downwardly inclined ramp portion 26 which when disc 22 is located within peripheral wall 23 engages behind the nib of an arm 27 which is formed integrally with the base 28. By pushing arm 27 downwardly the nib comes clear of ramp 26 thereby allowing pipe 21 to be drawn axially away from manifold 15 so that pipe 21 is removed from the end portion 15a of manifold 15 which extends from the plane of union base 20. To facilitate sealing between the inner wall surface of pipe 21 and end portion 15a a sealing ring 24 is provided as shown.

Container 10 is supported above mounting bracket 30 as will hereinafter be described. The mounting bracket 30 is fixed by a suitable clamp 31 to a stanchion 32 which is part of the pipe work in the milking shed to which the device is installed.

The valve unit consists of a rotating housing or first section 29, a stationary section 33 and an intermediate section 34. To facilitate further description of the valve unit reference is made more particularly to FIG. 4. Stationary section 33 is formed in two parts, being an inner part 35 and an outer part or cover plate 36. The cover plate 36 has two ports 37 and 38 of port 37 is coupled to a cylinder (not shown) which forms part of a cluster removal device and port 38 is coupled to a vacuum source (also not shown). Inner part 35 has two through bores 39a and 39b though in FIG. 4 only bore 39a is evident. These pairs of bores are aligned with and communicate with ports 37 and 38 as can be seen in FIG. 4 where port 38 is aligned with bore 39a. Cover plate 36 which is preferably fastened to inner part 35 by a removable clip 40 has a central dished portion 41.

Clamped between parts 35 and 36 is a flexible diaphragm 42 which with dished portion 41 forms a chamber 43.

Inner part 35 has a radially disposed inlet pipe 44 which has its outer end formed with a greater diameter as at 45 so as to fit over upstanding hollow spigot 46 which is integrally formed as part of mounting bracket 30. To provide for ready assembly and disassembly, end 45 of inlet pipe 44 is provided with a pair of peripheral downwardly extending legs 47 (one only which is shown in FIG. 4). Two curved slots (not shown) immediately adjacent spigot 46 are formed in the upper surface 30a of mounting bracket 30 and the feet 47 locate in these slots with the foot 48 of the leg 47 engaging with the underside of the top 30a of mounting bracket 30 when inlet pipe 44 is axially rotated to position inner part 35 into the orientation shown in the drawings. Inlet pipe 44 is thus locked against upward or downward movement. Spigot 46 extends through mounting bracket 30 and a milk line P$_2$ leading to a teat-cup cluster can be inserted over this lower portion 46a.

Inlet pipe 16 extends through the base of housing 29 to terminate beyond the terminal edge of the peripheral wall of housing 29. The outer end of inlet pipe 16 locates as shown in a coaxial tubular portion 50 of inner part 35. This tubular portion 50 has a mouth 51 at its outer end said mouth being sealable by diaphragm 42 as will hereinafter be described. The inner end of tubular portion 50 in conjunction with a tubular extension 52 which is coaxial with tubular portion 50 forms a shoulder 53. Located against this shoulder 53 is an O ring 54 which prevents fluid entering tubular portion 50 from travelling other than through inlet pipe 16.

Intermediate section 34 is essentially an annular member which is rotatable on tubular extension 52 and a tubular member 54 which is attached to tubular extension 52. Tubular member 54 has a radially projecting rim 55 at the outer end thereof and this maintains intermediate section 34 in place. A cavity or groove 56, which when intermediate section 34 is viewed face on, of arcuate shape is provided at the periphery of section 34 and is of a length such that it can span over through bores 39a and 39b leading from ports 37 and 38 (see dotted detail in FIG. 1). As can be seen with reference to FIG. 3 the intermediate portion 34 has two substantially diametrically opposed projections 56 and 57. Projection 56 has a radially disposed bore 58 in which is captured a spring loaded ball 59. Projection 57 has a threaded opening in which is located a threaded end of a lever 60 which projects through a peripheral slot 61 in the wall of housing 29. Lever 60 also projects through an opening in a dust cover 62 which extends substantially around the wall of housing 29.

To maintain sealing O ring 54 in position it is engaged with a pressure ring 63 which is engaged by one end of a coil spring 64 projecting from a mounting ring 65. Mounting ring 65 has a pair of diametrically disposed outwardly projecting arms 66. With the ring engaged on shoulder 52 pressure ring 63 is brought into engagement with the ring and then pressure applied by inserting arms 66 through a pair of diametrically opposed slots in rim 55 followed by a small rotation of mounting ring 65 so as to bring arms 66 into a circumfrential extension of slot 67. Preferably arms 66 are each provided with a recess 66a with engages when the arms are positioned in the extension of slots 67 with an abutment 55a carried by rim 55. Mounting ring 65 is thus locked into place and due to the compression of spring 64 as mounting ring 65 is placed in position the sealing ring 54 is firmly engaged with shoulder 53.

Inlet and outlet pipes 16 and 17 respectively form the axle about which container 10 can pivot. The projecting ends of pipe 16 and 17 respectively engage in tubular portion 50 and pipe 21 which themselves are parts of fixtures mounted by mounting bracket 30. The section which includes outlet pipe 21 and the stationary section 33 of the valve unit thus support container 10 above mounting bracket 30. As will be appreciated from the foregoing description the various components can be readily dismounted by firstly removing the section having outlet pipe 21. This is followed by removal of lever 60 whereupon the outer end of inlet pipe 16 can be removed from stationary portion 33. Mounting ring 65 can be readily removed thus providing access to sealing ring 54. Diaphragm 42 is readily accessible by removing clip 40 and drawing outer plate 36 from inner part 35. Stationary part 33 can itself be readily removed from mounting bracket 30 by giving it a stist so that feet 48 are clear of the underside 30a of mounting plate 30 and can be removed through the arcuate slots.

To further describe the invention reference will be made to its operation. It will be appreciated that the valve unit forms the actuating mechanism for a cluster remover and the counterbalanced container 10 is simply a means of activating the valve according to a prescribed sequence of events. The sequence is as follows and in this it is assumed that milking is in progress and the operator is about to put the teat cups on a cow.

At this point in the sequence the container is empty and is therefore in the raised position with the counterweight 13 lowermost, i.e. as shown in FIG. 1. In this position the valve has the configuration as shown in FIG. 4. The lever 60 is in the position shown in FIG. 1 and the spring loaded ball 59 is located in an opening 69 in the wall of housing 29. In this position groove 56 couples ports 37 and 38 via the through bores 39a and 39b. Acordingly the removal cylinder is connected to vacuum.

In addition diaphragm 42 is seated against mouth 51 to close off tubular portion 50 from inlet pipe 44. This occurs because of a pressure differential between the chamber 43 and tubular portion 50. Referring to FIGS. 5 and 7 of the drawings the inner part 35 of stationary portion 33 has a third through bore 39c which opens at one end into a blind port 70 in cover plate 36 (see FIGS. 6 and 7). A small passageway 71 couples the blind port 70 to chamber 43. When the inner ends bores 39a and 39b are coupled by groove 56 the inner end of the third bore 39c which is aligned with blind port 70 opens into housing 29 via passageway 71. As the inside of the housing 29 is at atmospheric pressure due to a lack of sealing between dust cover 62 and slots 61 in the housing wall the chamber 43 is open to atmospheric pressure whilst subatmospheric pressure exists in tubular portion 50 so sucking diaphragm 42 onto mouth 51.

The operator takes the cluster in one hand and with the other rotates lever 60 to the lower position where lever 60 engages with the outer end of a locking lever 74 as shown in dotted detail in FIG. 1. In this position the spring loaded ball 59 is disengaged from opening 69 and thus intermediate section 34 is rotated so that groove 56 couples bore 39a with the third bore 39c. As a result cylinder port 37 is open to atmospheric pressure and vacuum is applied to chamber 43 which acts over the full area of the back of the diaphragm 42. In addition vacuum is applied at the cluster via pipe 16 tubular portion 50, pipe 44 and line P2 due to diaphragm 42 moving from mouth 51. Because the milk claw has a bleed hole in it the vacuum acting on the front of the diapgragm is never as great as the vacuum acting on the back i.e. in chamber 43 (which is a "closed" vessel) so that the diaphragm remains in the stable open position due to the pressure differential.

The cluster is now taken to the cow's udder and fitted in the normal manner. This movement of the cluster is possible as no vacuum is being applied to the removal system due to port 37 venting to atmosphere. When the cow starts to "let down" the container fills and just prior to it being full it swings down thus rotating the housing 29 during which movement the spring loaded ball 59 once more comes into engagement with opening 69 so coupling intermediate section 34 to housing 29. The container 10 remains in this position throughout the remainder of the milk let down.

As the cow dries out the level of milk in container 10 drops until it is approximately 2% full. The counterweight 13 then swings downwardly rotating container 10, housing 29 and intermediate section 34 to the position shown in FIG. 1. Accordingly the blind port 70 is opened so venting the chamber 43 to atmosphere and allowing diaphragm 42 to seat on mouth portion 51.

The milk line $P_2$ is thus closed and the vacuum contained therein breaks down due to air admission at the bleed hole in the claw of the cluster. Further rotation of the container 10, housing 29 and intermeiate section 34 brings the counterweight 30 into contact with a stop 73 on mounting bracket 30. In this position groove 56 is realigned with bores 39a and 39b so that the vacuum is applied to the removal cylinder which lifts the cluster from the cow's udder.

When the next cow enters the bail the same procedure commences with lever 60 being moved downwardly into the lower position and cluster then applied.

The device is readily cleaned by back flushing and in the valve unit the flush liquid has a ready access to the inside surfaces of tubular portion 50, pipe 44, front of diaphragm 42 as well as all other surfaces which come into contact with milk flow. The device is thus easy to maintain in a hygienic state without dismantling the component parts.

When the device is cleaned by backflushing the container does not need to be locked in any particular position. However, when the device is cleaned by forward drawn vacuum cleaning the valve is locked open and the container is locked in the position shown in FIG. 1. The locking operation is carried out by set lever 60 being lowered to the position shown in dotted detail in FIG. 1 which causes it to engage with locking lever 74. This step moves the valve to the open position. Locking lever 74 is pivotally mounted on an upstand 75 extending from mounting bracket 30. The end of lever 74 opposite to that which engages with lever 60 has a lip 74a. When lever 60 engages lever 74 the latter pivots so that lip 74a moves upwardly and engages with a pair of lugs 74b mounted on or formed with housing 29.

The design of lugs 74b with lip 74a are such that engagement therebetween is itself not sufficient to lock the container in place as this would cause the device to be inoperative during normal use. To lock the valve open and also complete locking of the container a cord 76 which is attached to lever 60 is inserted to slot 77 in a projection 78 from mounting bracket 30. This clamping of cord 76 ensures that downward pressure from lever 60 is applied to lever 74 to thus keep lip 74a engaged with lugs 74b.

This locking of the container and valve during forward flushing means that the valve is not activated during cleaning operations involving two or more steps. This prevents the ram from removing the cluster out of the bucket or off the jetter. The container is locked for other reasons which also apply to backflushing. These reasons are that there is maximum flow and turbulence on the container surface and that there is full coverage of the container surface.

To achieve complete or near complete scavenging of container 10 a small passageway is moulded in manifold plate 11 and extends upwardly from adjacent the wall of the container 10 to open into outlet pipe 17. As can be seen in FIG. 2 passageway 79 is angled upwardly toward outlet pipe 17 so that it enters the said pipe 17 on an angle.

Scavenging of the container is required at the completion of the last cow being milked. The scavenging operation is conducted with the valve locked open and the container in the position shown in FIG. 1. The flow of air through the valve and along pipe 17 sets up a venturi effect in passageway 79 which draws out the milk remaining in container 10. Complete scavenging of the container is thus possible. It will be appreciated that such scavenging is necessary as the device operates with a quantity of milk remaining in container 10 after each cow has been milked. The scavenging is thus only necessary after the last cow has been milked.

The scavenging operation automatically takes place following forward flushing as air flows along pipe 17 after the flushing liquid has been completely used up. With back flushing the scavenging operation must take place following completion of pumping of the flushing liquid.

We claim:

1. A valve unit for the liquid flow sensing device of the type having control means which is movable between first and second positions when the flow rate is respectively low and high but biassed to the said first position, said valve unit comprising: a first valve section movable in response to movement of the control means, a second valve section fixed in relation to said first section, said second valve section having first and second ports therein, a third valve section being movable independently of said first and second valve sections and having means for connecting said first and second ports, said first and second valve sections defining a fluid flow passage therethrough, a diaphragm disposed on said second valve section for closing said flow passage, a valve cover plate disposed adjacent to said diaphragm and defining a chamber therewith, said third valve section being movable so that the first port is isolated from said second port but is coupled to said chamber when the control means is in said first position and moves to said second position and means for coupling said third valve section to said first valve section such that as the control means reverts to said first position it moves both the first and third sections relative to said second section and the first port is coupled to said second port by said port connecting means but isolated from said chamber.

2. A valve unit as claimed in claim 1 wherein said flow passage extends between an inlet and outlet, said flow passage including a seating located between said inlet and outlet with which the diaphragm can engage to close the flow passage when the pressure existing in said flow passage is lesser than that which exists in said chamber.

3. A valve unit as claimed in claim 1 or 2 wherein said third section is of substantially annular shape and is located for rotational movement within a circular opening in said first section, said circular opening being closed by said second section, the third section being rotatable within the first section by external operating means.

4. A valve unit as claimed in claim 2 wherein the first and second ports, inlet, chamber, diaphragm and diaphragm seating are rotably fixed with said second section and said outlet is provided in said first section.

5. A valve unit as claimed in claim 1 or 4 wherein said second section includes said cover external of said first section, said cover retaining said diaphragm in place and including a cavity which is covered by said diaphragm to form said chamber.

6. A valve unit as claimed in claim 5 wherein the first and second ports extend through said cover and define first and second passages which extend through said second section to a surface which faces a surface of said third section, the port connecting means being formed by a groove in the said surface of the third section, said second section having a third passage which extends from said chamber to open at the same surface as the first and second passages.

7. A valve unit as claimed in claim 6 wherein said groove is of curved shape and coaxial with the axis of rotation of the third section, the length of the groove being sufficient to span between the first and second passages and the first and third passages respectively.

8. A valve unit as claimed in claim 2 wherein said third section is mounted for rotational movement on a tubular portion of said second section said tubular portion having located therein a conduit of said first section which forms part of said flow passage and extends from said outlet, said conduit forming at its end, or opening into, a mouth portion which forms said diaphragm seating.

9. A valve unit as claimed in claim 8 wherein a sealing means is provided between said conduit and the second section adjacent said diaphragm seating.

10. A valve unit as claimed in claim 2, wherein the first section of said valve unit is coupled to said control means to be movable therewith and said cover plate is fixed in relation to said first section.

11. The device as claimed in claim 10 wherein said control means comprises a container mounted for rotation about a pivot axis so as to be movable between said first and second positions, said container having an inlet and outlet, the inlet being connected to the valve outlet by a passage coaxial with said pivot axis and the outlet leading into a passage also coaxial with said pivot axis, the first, second and third valve sections being rotatable relative to each other about an axis coaxial with said pivot axis.

12. Apparatus for the removal of milking machine teat cups from an animal being milked comprising a liquid flow sensing device as claimed in claim 11, a milk line coupling said valve inlet to a teat-cup cluster, a conduit coupling the container outlet to a milk receiver and vacuum source, a conduit coupling said first port to said vacuum source, a conduit coupling the second port to a cluster removal cylinder and said chamber venting to atmosphere when said first port is isolated from said chamber.

* * * * *